Sept. 6, 1966                H. E. CLARK                3,270,637
                        ELECTROVISCOUS RECORDING
Filed Oct. 3, 1963                                      4 Sheets-Sheet 1

INVENTOR.
HAROLD E. CLARK
BY
*Stanley B. Cole*
ATTORNEY

Sept. 6, 1966 H. E. CLARK 3,270,637
ELECTROVISCOUS RECORDING
Filed Oct. 3, 1963 4 Sheets-Sheet 2

INVENTOR.
HAROLD E. CLARK
BY Stanley 3 Cole
ATTORNEY

Sept. 6, 1966          H. E. CLARK          3,270,637
ELECTROVISCOUS RECORDING
Filed Oct. 3, 1963          4 Sheets-Sheet 3
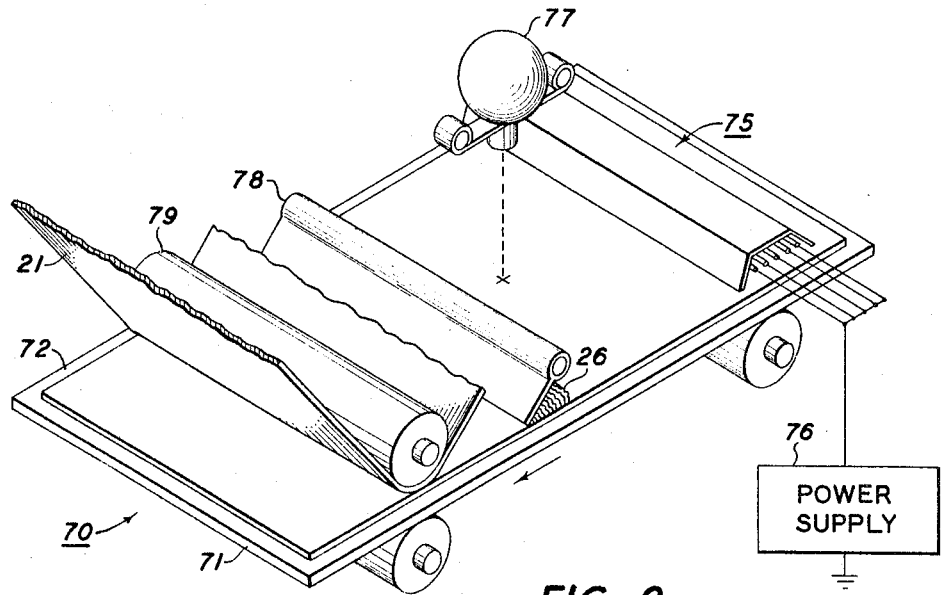
FIG. 9
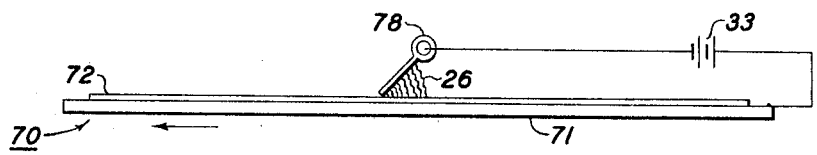
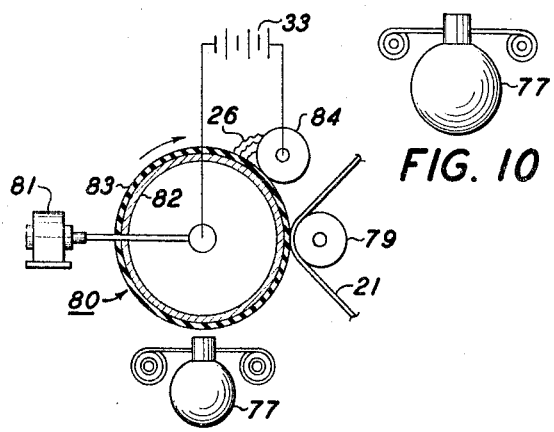
FIG. 10
FIG. 11
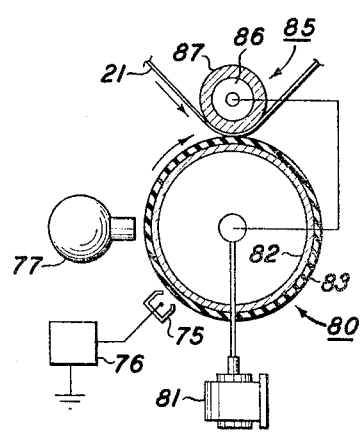
FIG. 12
INVENTOR.
HAROLD E. CLARK
BY Stanley B Cole
ATTORNEY Sept. 6, 1966         H. E. CLARK         3,270,637

ELECTROVISCOUS RECORDING

Filed Oct. 3, 1963         4 Sheets-Sheet 4

INVENTOR.
HAROLD E. CLARK

BY Stanley Z Cole

ATTORNEY

United States Patent Office 3,270,637
Patented Sept. 6, 1966

3,270,637
ELECTROVISCOUS RECORDING
Harold E. Clark, Penfield, N.Y., assignor to Xerox Corporation, Rochester, N.Y., a corporation of New York
Filed Oct. 3, 1963, Ser. No. 313,675
13 Claims. (Cl. 95—1)

This invention relates to novel means and methods for graphic recordation of information, based upon direct electrical control of liquid flow. The invention will be described with reference to the following figures:

FIG. 9 is an isometric view illustrating a further recording method;

FIG. 10 is a sectional view illustrating a modification of the method of FIG. 9;

FIG. 11 is a sectional view illustrating a further recording apparatus;

FIG. 12 is a sectional view illustrating a further embodiment of the invention;

It has been shown by Willis M. Winslow that the apparent viscosity of certain liquids can be markedly altered by applying an electric voltage or electric field to these materials. (Journal of Applied Physics 20, 1137 (1949), U.S. Patents 2,417,850; 2,661,596; 2,661,825; 2,663,809; 3,047,507). Generally speaking, these liquids comprise a suspension of micron sized solid particles in a liquid carrier. It is desirable to have a certain amount of water present as an adsorbed layer on the particles, and various other materials are known to be desirable additives.

The effect of an electric voltage on these liquids may be termed the electroviscous or electroviscosity effect and the liquids themselves are termed electroviscous liquids.

The Winslow patents and publications noted above include numerous formulas for electroviscous liquids, any of which may be used in connection with the present invention. Since the present invention is concerned with graphic recording, it is desirable that the electroviscous liquids employed have a dark or readily visible color. This can be accomplished by modifying the liquids disclosed by Winslow in either or both of two different ways: Carbon black may be employed as the solid component of the liquid or a soluble dye may be added to the liquid. Other pigments may be used instead of carbon black, but carbon black has a desirably high visual density and has been found to promote a large electroviscous effect.

Other types of homogeneous liquids also exhibit an electroviscous effect and are useful in the present invention. These include: solutions of metal soaps in non-polar hydrocarbons; mixtures of mutually soluble substances which can exist as solid or liquid solutions at different temperatures and which exist in the liquid crystalline state in liquid solutions; solutions of paraffin sulfates which form micetles; and liquid crystals; i.e. elongated molecules which contain one or more polar groups and which form nematic, smectic, or cholesteric phases. Further information on non-particulate electroviscous materials may be found in the literature, e.g. Bjornstahl and Snellman, Kolloid Zeitschrift vol. 78, p. 258 (1937); Bjornstahl and Snellman, Kolloid Zeitschrift, vol. 86, p. 223 (1939); Michailoff and Zwetkoff, Acta Physicochimica U.R.S.S. vol. 10, p. 415 (1939).

Figure 1:
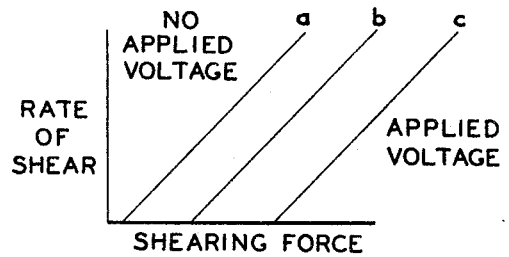
FIG. 1 is a graph showing the effect of voltage upon viscosity.

FIG. 1 graphically illustrates the electroviscous effect as employed in the present invention. Three curves are shown, each relating the rate of shear in an electroviscous liquid to the shearing force associated with the rate of shear. The curve $a$ labeled "no applied voltage," shows the properties of an electroviscous fluid in the absence of any voltage. It can be seen that the curve is substantially a straight line and passes nearly through the origin. A straight line passing through the origin is characteristic of common liquids such as water or oils and the slope of the curve is a measure of the viscosity. The slight displacement of the curve from the origin is characteristic of many electroviscous liquids. As shown, for example, by Winslow the viscosity of electroviscous liquids can be varied in accordance with the particular ingredients and proportions employed as well as by voltage. A viscosity of about 1000 poises, in the absence of any voltage, has been found to be particularly desirable. When a voltage is applied to the electroviscous fluid, its properties become very different as illustrated in the curves $b$ and $c$ labeled "applied voltage." It has been found that the liquid does not actually undergo a change in viscosity in the strict sense, since each curve in FIG. 1 shows substantially the same slope, which is the measure of viscosity. Instead, the liquid jells or becomes grease-like, as shown by the fact that the applied voltage curves $b$ and $c$ do not pass near the origin of FIG. 1. This indicates that the liquid, when a voltage is applied, will not flow at all unless a certain minimum force is applied. This force is actually related to the applied voltage and varying the voltage would produce a family of substantially parallel curves as shown in FIG. 1, where $c$ represents a higher voltage than $b$. This aspect of the electroviscous effect was not previously known but is very beneficial for the present invention. Curves of the type shown in FIG. 1 can be made with the aid of a commercial rotating cup viscosimeter modified to permit the application of a controllable voltage between the inner and outer cups.

Figure 2:
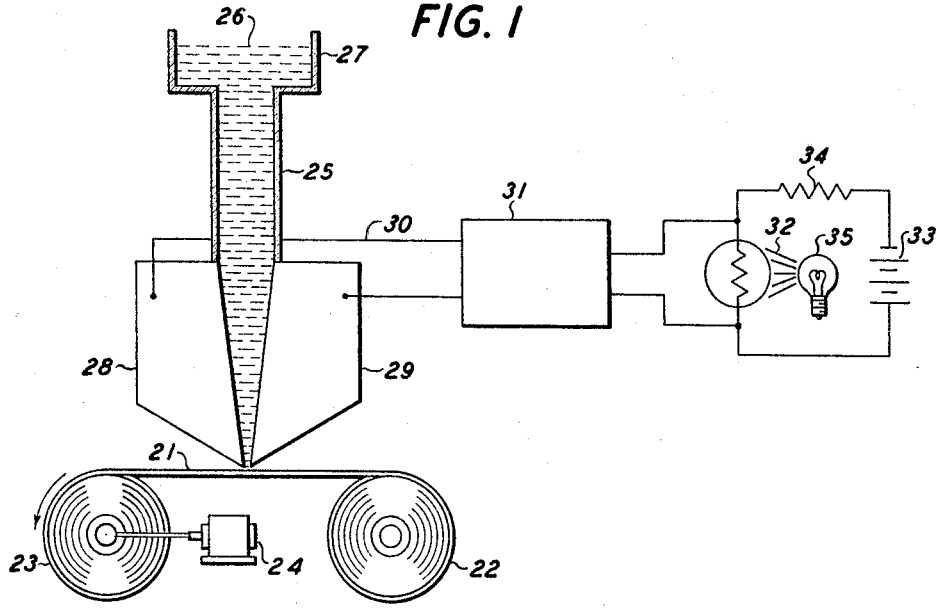
FIG. 2 is a schematic sectional view of one form of recording apparatus.

An elementary embodiment of the invention is illustrated in FIG. 2. There is shown a recording member 21 in the form of a flexible web, such as paper, which travels from a supply spool 22 to a takeup spool 23 which is driven by a motor 24. Since the recording member has no function other than to receive a visible pattern of liquid, it may actually be flexible or rigid, thick or thin and of almost any physical form or material. Positioned above recording member 21 is a tube 25 of electrically insulating material filled with an electroviscous liquid 26. The tube may optionally include a reservoir 27 at its upper end, or other means may be used to supply the fluid to the tube so as to provide a slight hydrostatic pressure at the lower end of the tube. A pair of closely spaced brass electrodes 28 and 29 form an extension of the lower end of tube 25. The gap between electrodes 28 and 29 narrows to a slit about 8 mils wide. These electrodes are connected by wires 30 through a transmission circuit 31 and thence to a photoconductive cell 32. A battery 33 applies a voltage on the order of several hundred volts to photocell 32 through resistor 34. A lamp 35 is positioned so as to illuminate a photocell 32 when energized. In the absence of lamp 35, voltage from battery 33 travels through resistor 34, through transmission circuit 31 and wires 30 to electrodes 28 and 29. The electric field established between these electrodes causes the electroviscous liquid 26 in tube 25 to increase in viscosity or jell and thus prevents any of the liquid passing out the lower end of tube 25 onto recording member 21. In this condition, no mark appears on the recording member. However, when lamp 35 is turned on, the resistance of photoconductive cell 32 drops markedly, thus, effectively shortcircuiting battery 33 so that most of the voltage therefrom appears across resistor 34 rather than between electrodes 28 and 29. Under these conditions, the electroviscous liquid 26 is free to flow through tube 25 onto recording member 21 and to leave a mark thereon.

Elements 31, 32, 33, 34 and 35 are illustrative only and are included to suggest various means by which a controlling voltage might be applied to electrodes 28 and 29. Thus, the transmission circuit 31 might be no more than a few inches of wire or might equally well be a transcontinental radio circuit. Any source of electrical signals can be used to operate electrodes 28 and 29. Elements 32, 33, 34 and 35 show one means of creating controlling electrical signals in response to light. More elaborate means will be shown in connection with further embodiments of the invention. This embodiment as well as others to be described permits graphic recording without great mechanical pressure, without heat, without sparks, without chemical reactions, and without various other impediments of prior methods.

Figure 3:
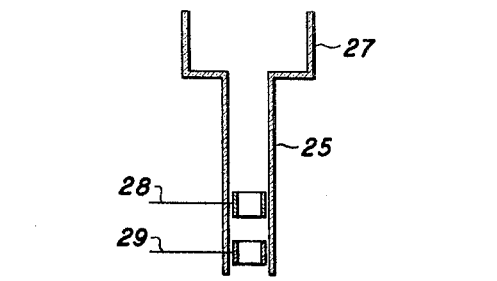
FIG. 3 is a sectional view of a modified element for use in the apparatus of FIG. 2.

FIG. 3 illustrates a modified form of the tube 25 of FIG. 2. In this embodiment the electrodes 28 and 29 are positioned one below the other within tube 25 instead of opposite each other as in FIG. 2. Provided the electrodes in FIG. 3 are not spaced so far apart as to prevent an adequate field from being applied therebetween, the tube of FIG. 3 will function in a similar manner to that of FIG. 2.

Figure 4:
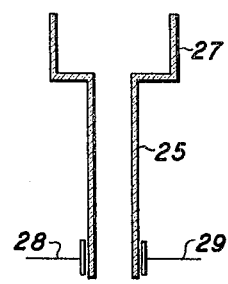
FIG. 4 is a sectional view of a further modified element for use in the apparatus of FIG. 2.

FIG. 4 shows still a further modification of the tube 25 of FIG. 2. In this modification, the electrodes are applied to the outside of the tube rather than to the inside. Here the insulating wall of the tube is interposed between the electrodes and the electroviscous liquid within the tube. This arrangement is satisfactory where it is desired to stop and start the flow of the liquid many times each second. However, this arrangement may not be used with a D.-C. voltage source where it is desired to stop the flow of liquid for considerable lengths of time because the insulating wall of the tube, together with the somewhat less insulating nature of the liquid, prevents a permanent field from being applied to the liquid from external electrodes. These limitations do not apply when an A.-C. voltage is applied to the electrodes. An A.-C. voltage may be used with other embodiments also.

Since tube 25 is shown in section in FIGS. 2, 3 and 4, these figures can be interpreted as showing a section through either a pair of parallel plates or through a tube. The former arrangement is actually permissible and desirable in connection with the invention. In this arrangement, the electroviscous fluid flows through a long narrow channel and emerges through a long narrow slot. Again, electrodes 28 and 29 may be used to selectively and controllably stop the flow of liquid. It is also possible to use a multiplicity of pairs of electrodes spaced along the length of the channel, i.e., normal to the planes of FIGS. 2, 3, and 4, in order to selectively control the flow of electroviscous fluid in any particular portion of the slot. Each pair of electrodes can be provided with a control circuit as shown in FIG. 2. In this manner, it is possible by controlling the voltages applied between the electrodes, to provide a two-dimensional arbitrary pattern on the recording member 21.

Figure 5:
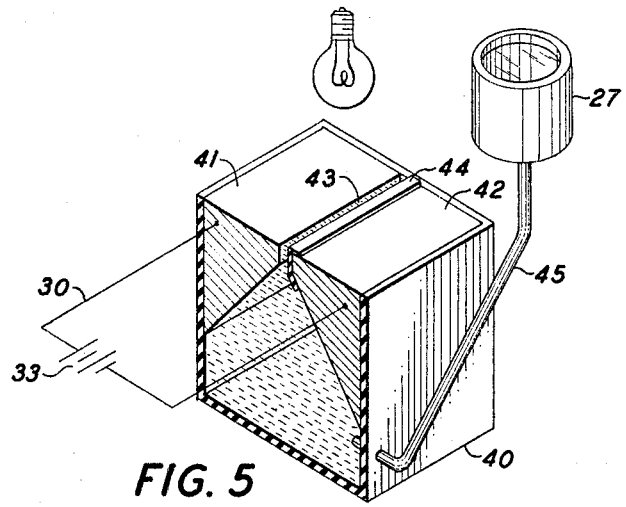
FIG. 5 is an isometric view of a further type of recording element.

FIG. 5 is a sectional view of a different type of controlled element for use in electroviscous recording. An insulating tank 40 has mounted therein a pair of electrically conducting blocks 41 and 42. These blocks are mounted as shown, so as to define a narrow slit 43 therebetween. Typically, the slit may be about 6 mils wide and about 10 mils in depth. The surface of at least one of the blocks is coated with a thin layer of photoconductive material 44 at least in the area bordering the slit 43. Photoconductor 44 is normally quite thin, on the order of 1 or 2 mils and may comprise any material having a very high electrical resistivity in darkness and a substantially lower resistivity when illuminated. Vitreous selenium is a suitable material as well as others including the organic photoconductors marketed by Kalle and Company of Wiesbaden, Germany, and disclosed in U.S. Patents 3,072,479, 3,037,861 and 3,041,165 and Canadian Patent 611,852. Blocks 41 and 42 are connected by wires 30 to a battery 33. Tank 40 is kept filled with an electroviscous liquid 26 which is maintained under a slight pressure by the presence of a liquid in a communicating hose 45 and reservoir funnel 27. The funnel is ordinarily maintained at a level several feet above slit 43. A hydrostatic pressure in tank 40 will cause the electroviscous liquid 26 to ooze upwardly through slit 43 since the insulating qualities of photoconductor 44 relative to liquid 26 prevent battery 33 from creating a strong field across the slit. If, however a lamp 35 positioned as shown, is turned on, the photoconductor 44 will become conductive and permit the electric current from battery 33 to pass through the slit 43, thus blocking the passage of liquid through the slit. It is also possible to selectively control the flow of liquid in different portions of the slit by illuminating some portions and not others. Various obvious modifications are possible in the device of FIGURE 5. Thus, photoconductor 44 can be applied to each of blocks 41 and 42 instead of merely to one of them as shown. Also, either or both blocks may be made of a transparent insulating plastic with a transparent conductive coating thereover, instead of a solid electrical conductor such as brass or aluminum. By this means, the flow of liquid in slit 43 can be controlled by shining light at the slit from other directions than that shown in the figure.

In a particular example, electroviscous liquid 26 was prepared by mixing 125 grams of silica gel (11 micron average particle size) with 675 milliliters of heavy paraffin oil (white heavy, Will Corporation) and 0.7 milliliter water and ball milling overnight. When used in the apparatus of FIGURE 5, 1500 volts was applied from battery 33 and flow through the 6 mil wide slit 43 was stopped when 2000 foot candles was directed at the slit. Photoconductor 44 was a mixture of an organic photoconductor available as To 1920 (2,5-bis(para-aminophenyl)-1,3,4-oxadiazole) from Kalle and Company and Vinylite VYNS (vinyl chloride-vinyl acetate copolymer) (Union Carbide).

In a further example, electroviscous liquid 26 was prepared by dry milling Acetamine Rubine B for 1½ days to achieve a particle size of approximately one micron. Twenty grams of this were mixed with 80 milliliters of the same paraffin oil described above and the mixture was milled for 3 hours. The resulting liquid had a deep red color. When used in the apparatus of FIGURE 5, 1200 volts was applied from battery 33 and flow through the 6 mil wide slit 43 was stopped when 2000 foot candles was directed at the slit. When slit 43 was reduced to 3 mils, 800 volts was sufficient.

Figure 6:
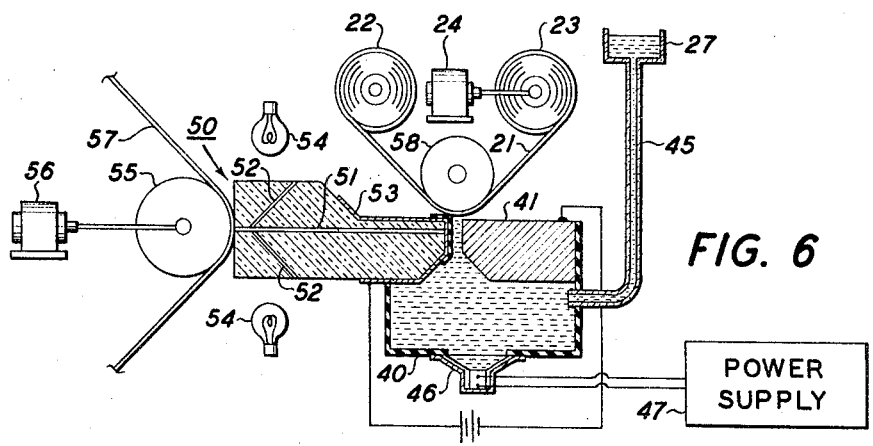
FIG. 6 is a schematic sectional view of a recording apparatus incorporating a modified form of the element of FIG. 5.

The general type of element shown in FIGURE 5 may be adapted to a complete recording or reproducing device as shown in FIGURE 6. In this figure, tank 40, electroviscous liquid 26, hose 45, funnel 27, battery 33, wires 30, and block 43 are substantially the same and perform the same functions as in FIGURE 5. Block 42, however, has been replaced with a modified block 50. This is a plastic or glass block having an array of thin optical glass fibers 51 imbedded in the midline of the block. A pair of light reflective surfaces 52 are included within the block as shown and are oriented at an angle of about 45° from the fiber axis as shown. The right hand end of the block is covered with a thin electrically conductive transparent coating 53 which may, for example, be a chemically formed layer of copper iodide or may be a thin vacuum evaporated layer of metal. A layer of photoconductor 44 is coated over the edge of the block in a manner similar to that shown in FIGURE 5. In this embodiment, the photoconductive material is normally confined to the edge of block 50 and is not applied to the edge of block 41. If, however, electroviscous liquid 26 is reasonably transparent, the photoconductive material can be applied to block 41 instead. Clear liquid may be used when it is not necessary to create an immediately visible image or when the liquid is adapted to react with a component of the recording material to produce a visible image. Block 50 can be prepared from fiber optical blocks sold by the American Optical Company. These blocks are available as 1 x 3 x 10 inch rectangular solids incorporating the fiber optic layer and internal reflectors as shown in FIGURE 6, but lacking the cross-sectional configuration and conductive and photoconductive coatings shown in FIGURE 6. The commercially available block can be milled to a shape similar to that shown in the figure and coated with a transparent electrical conductor and a photoconductor as described and shown.

A pair of lamps 54 is provided as shown to direct light at reflective surfaces 52 from which it is reflected towards the left of bar 50. A soft roller 55 driven by a motor 56 is provided adjacent the left end of block 50 and serves to slide an original document over the left or outer end of bar 50 so that the printed or image bearing side of the document contacts the end of the bar and particularly the ends of fibers 51. The light reflected by reflectors 52 from lamps 54 impinges on the document and light reflected from the document travels along fibers 51 to photoconductor 44. Wherever light passing down a fiber 51 reaches the photoconductor 44, voltage is thereby applied to slit 43 and the flow of electroviscous liquid 26 is stopped in that region. This occurs only when a fiber 51 is opposite a white area of document 57. When the fiber is opposite a black area no light is transmitted by the fiber, the photoconductor remains in the insulating condition, and the liquid 26 is free to flow through slit 43. A further rotatable roller 58 is positioned directly above slit 43 and is adapted to pass a web of recording material 21 against or close to the slit. The recording material passes from a supply spool 22 to a takeup spool 23 which is driven by a motor 24. Motor 24 and 56 are preferably so synchronized that document 57 and recording web 21 move at exactly the same rate of speed. Where electroviscous liquid 26 is permitted to flow through slit 43, it leaves a visible mark on recording member 21 but when the flow of liquid 26 is interrupted no mark is produced on member 21. Since liquid 26 is preferably dark in color and is permitted to flow through slit 43 only when a dark area of document 57 is opposite fibers 51, it is apparent that a faithful full-sized reproduction of the original document 57 appears on recording member 21. The copy may, if desired, be longitudinally expanded or contracted simply by varying the speed of motor 24 with respect to motor 56. The transverse dimension of the copy, however, is necessarily the same as that of the original, unless block 50 is so constructed that fibers 51 converge or diverge in a plane normal to that of FIGURE 6. Size to size copying is normally preferred however.

Once electroviscous liquid 26 contacts recording web 21 there is a tendency for the moving web to drag some liquid out of slit 43 even after a voltage is applied across the slit. This lowers the resolution of images produced by the apparatus. For this reason it is desirable to break contact between the liquid and the web at frequent intervals. One suitable method is to create periodic pressure variations in tank 40. This can be accomplished by mounting a small liquid-tight loudspeaker 46 in a wall of tank 40 and connecting it to an A.C. power supply 47 which provides periodic pulses at low audio or subaudio frequencies. Ordinary A.C. is less desirable. It is also possible to energize loudspeaker 46 from a 60 cycle power line through a step down transformer. Momentary motion of the loudspeaker lowers the pressure in tank 40 and causes liquid 26 to be temporarily sucked back into slit 43 and out of contact with web 21. Other forms of pressure transducers can be used instead of loudspeaker 46, including piezo-electric and magnetostrictive transducers and motor driven diaphragms.

Figure 7:
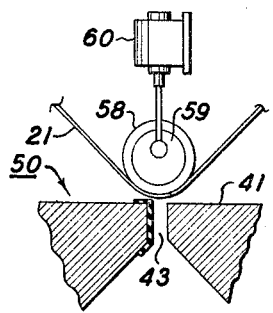
FIG. 7 is a sectional view of part of the apparatus of FIG. 6 with modifications.

FIGURE 7 shows a small portion of FIGURE 6 including a modified form of roller 58 as a functional replacement for loudspeaker 46. Roller 58 is rotatably mounted about an inner roller 59 which is forceably rotated about a non central axis by motor 60. By this means, roller 58 is caused to reciprocate in a vertical direction thus alternately bringing recording web 21 in and out of contact with slit 43. This is similarly beneficial in reducing the effects of viscous dragout, which otherwise tends to cause liquid 26 to be picked up on recording web 21 for some time after a voltage is applied across slit 43 to jell or solidify the liquid therein. In accordance, however, with the embodiment of FIG. 7, the web 21 is periodically removed from contact with slit 43 and thus liquid 26 is deposited on web 21 as it reapproaches the slit, if and only if, some liquid has flown through the slit since the last contact with web 21. Motor 60 should operate rapidly enough so that the transverse lines of recordation formed on web 21 are very close together and substantially indistinguishable from each other. The same conditions desirably apply to loudspeaker 46 of FIG. 6. Other means of oscillating roller 58 may be employed instead of the motor driven eccentric as shown.

Figure 8:
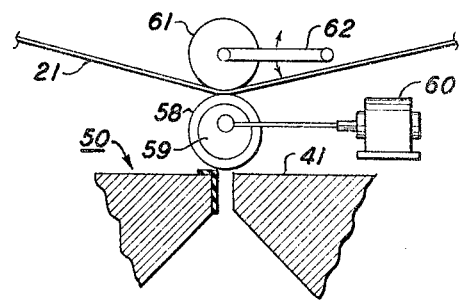
FIG. 8 is a schematic sectional view of part of FIG. 6 with still further modifications.

FIG. 8 shows a portion of the apparatus of FIG. 6 including still a further modification. Roller 58, which should have a smooth surface in this embodiment, is driven by an inner roller 59 and a motor 60 in the same manner as FIG. 7. In this embodiment, however, roller 58 itself contacts slit 43 and picks up on its surface a pattern of electroviscous liquid 27. This pattern is then transferred to recording web 21 which is kept in continual contact with roller 58 by a pressure roller 61 which is pivotably supported on an arm 62. Recording member 21 is preferably moved in the opposite direction to that shown in FIG. 7 and recording web 21 imparts the necessary rotation to roller 58 which functions in this embodiment as a transfer roller.

FIG. 9 illustrates a different form of the invention. Reference character 70 denotes a conventional xerographic plate. This comprises a support member 71 over which is coated a relatively thin layer of a photoconductive insulating material 72, such as, for example, vitreous selenium. Layer 72 has the property of being capable of accepting and retaining an electrostatic charge on the order of several hundred volts in darkness but of selectively dissipating this charge when exposed to light. Plate 70 is adapted to move from right to left by roller 73 and drive motor 74. Plate 70 first moves past the corona charging unit 75 which is connected to a power supply 76 which supplies several thousand volts to the corona unit. By this means, plate 70 is charged to a potential of several hundred volts. The plate then passes beneath a projector 77, which projects a light pattern onto the plate to selectively dissipate the charge thereon. Projector 77 projects an image which moves in synchronism with plate 70 to produce a sharp image and a sharp electrostatic pattern on the plate. The plate then moves past a conductive squeegee 78 which holds behind it a small amount of electroviscous liquid 26. The electric field between the charge pattern and the squeegee causes an instantaneous freezing of the liquid on the surface of the plate and the soft squeegee permits the jelled or frozen liquid to pass by but retains the unjelled liquid. Electroviscous liquids based on petroleum solvents or the like, as taught in the references cited earlier in this application, have sufficient resistivity to momentarily jell or freeze when placed in an electric field, even though the liquid may not be in actual physical contact with a pair of electrodes. The jelled liquid passing by the squeegee soon returns to the liquid state. It is, in any case, removed from plate 70 in image configuration by a recording member 21 such as a web of paper, which is urged against plate 70 by a roller 79. In this embodiment also, a reproduction of the original light pattern projected by the projector 77 is recreated in permanent form on web 21.

FIG. 10 shows a further embodiment of the invention. This embodiment likewise includes a xerographic plate 70 having a conductive support 71 and a layer of photoconductive material 72. In this embodiment, however, support 71 preferably comprises a transparent member. This may be accomplished through the use of a sheet of glass or plastic which is covered at least on its upper surface with a thin transparent electrically conductive layer such as tin oxide or copper iodide. A projector 77 directs an image pattern at plate 70, preferably through the transparent support member 71, as shown. A battery 33 maintains an electric voltage between support member 71 and a squeegee 78 which should have at least partly electrically conductive blade, such as of conductive rubber. A small amount of electroviscous liquid 26 is provided on the surface of plate 70. As squeegee 78 moves relative to the surface of the plate an electric circuit is completed between support member 71 and the squeegee in those areas where photoconductive layer 72 is exposed to the image pattern projected by projector 77. In these areas the electroviscous liquid jells or freezes when contacted by the squeegee and remains behind on the surface of photoconductive layer 72 as the squeegee passes over. In non-illuminated areas, however, the liquid remains in a fluid condition at all times and is removed from the surface of the plate by the squeegee. The remaining pattern of liquid may then be removed from the surface of the plate by a recording member in the same way shown in connection with FIGURE 9. Although no power driven mechanism is shown in FIGURE 10, it is obvious that the plate may be moved with respect to the squeegee by mechanical means and that further mechanical means may be used, as in FIGURE 9, to transfer the liquid pattern from the plate.

FIGURE 11 shows a further embodiment related to that of FIGURE 10. This embodiment includes a photosensitive drum 80 rotated about its axis by a motor 81. The drum includes a conductive inner core 82 and an outer photoconductive coating 83. This coating is of the type which will retain some residual conductivity after being illuminated. A paint-like coating consisting of a dispersion of French process zinc oxide particles in an organic resin binder is a well-known photoconductive material and is quite suitable for this purpose. A projector 77 projects a light pattern onto the drum which creates a residual electrical conductivity pattern in the drum, or more specifically in the outer coating 83. The drum then passes by a conductive roller 84 which supports a small amount of electroviscous liquid 26 and is maintained at a potential different from that of the drum by a battery 33. In areas where residual conductivity is present, a circuit will be created between conductive drum core 82 and roller 84 which will result in the local freezing, solidification, or jelling of electroviscous liquid 26. The solidified liquid is able to get past roller 84 but the remaining liquid is held behind. Thus, as the drum passes roller 84, it bears a pattern of electroviscous liquid corresponding to the pattern previously projected onto the drum by projector 77. This pattern may be examined on the drum or preferably is transferred to a recording member 21 by the aid of a roller 79 which urges member 21 against the drum. The squeegee 78 of FIGURE 9 or 10 could be used in place of roller 84 and conversely roller 84 could be used to replace squeegee 78 in FIGURES 9 and 10.

FIG. 12 illustrates still a different form of the invention. The apparatus includes a rotating drum 80 similar to that shown in FIG. 11. In this embodiment, however, it is generally preferable that the photoconductive coating 83 have maximum dark resistivity but it is not necessary that it exhibit residual conductivity after illumination. Accordingly, vitreous selenium is a preferred material for the photoconductive material 83. A corona discharge element 75 positioned adjacent the drum and connected to a high voltage power supply 76 serves to apply an electrostatic charge, preferably positive, of several hundred volts to the surface of the drum 80. The drum then rotates past a projector 77 where a light pattern is projected onto the drum to create a residual charge pattern. Drum 80 then rotates past a liquid dispensing roller 85 which presses a recording member 21 against the drum. In this particular embodiment, the recording member should be a good electrical insulator and, accordingly, it preferably comprises a plastic web or a web of thoroughly dry paper. Roller 85 includes an electrically conductive inner core 86 and a porous outer cover 87 containing electroviscous liquid. The porous material should be of the type in which any flowing liquid is compelled to take a serpentine path with many reversals of direction. A porous ceramic or fritted glass are both suitable materials for the porous cover 87. Each of these materials is well-known as an ultrafine filtering medium. Roller 85 may also contain one or more internal reservoirs for the electroviscous liquid. As the roller 85 presses recording member 21 against the drum, the electroviscous liquid tends to ooze out the porous covering 87 and deposit on the recording member 21. However, when roller 85 is opposite a charge retaining area of the drum, an electric field is established between the drum and the conductive core 86 of the roller. This field tends to solidfy the electroviscous liquid and plug up the fine capillary pores in the porous cover 87. This is particularly true of those portions of the capillary pores which happen to lie more or less perpendicular to the direction of the electric field. By connecting a battery 33, not shown, between roller 85 and drum 80 it is possible to cancel out the electrostatic field above charge retaining areas of the drum and to create an electric field in those areas not retaining charge. In this case ink will be deposited by roller 85 onto recording member 21 in areas corresponding to charge retaining areas of drum 80, instead of areas not retaining charge as in FIGURE 12 as shown. It is also possible to have roller 85 contact drum 80 directly so as to deposit a liquid pattern directly on the surface of drum 80. This pattern may then be transferred onto a separate recording member as shown, for example, in FIGURE 9. Further, roller 85 may be substituted for squeegee 78 or for roller 84 in FIGURES 9, 10 and 11.

Figure 13:
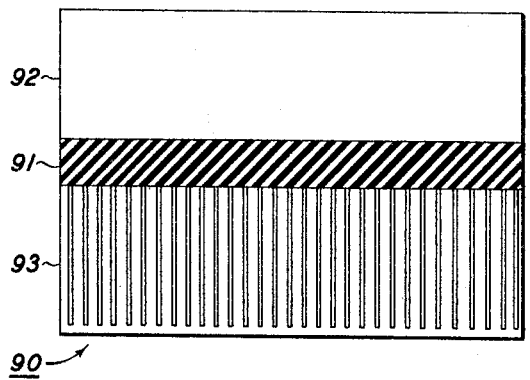
FIGS. 13 and 14 are plan and sectional views respectively, illustrating yet another recording element in accordance with the invention.
Figure 14:
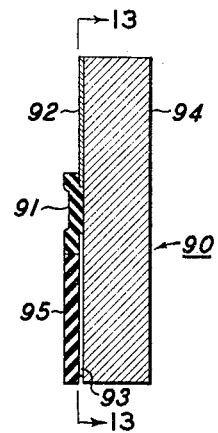
Figure 15:
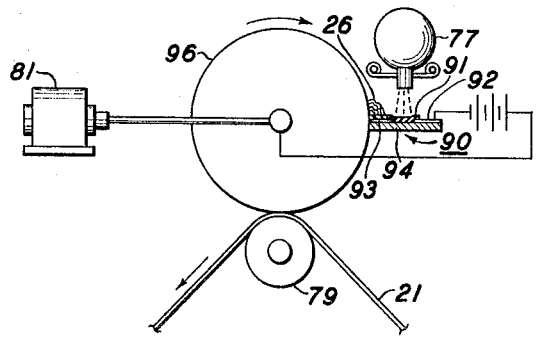
FIG. 15 is a schematic sectional view of a form of recording apparatus incorporating the element of FIGS. 13 and 14.

FIGURES 13, 14 and 15 illustrate a further embodiment of the invention. FIG. 13 illustrates in plan view of modified form of squeegee 90 in accordance with the invention. Reference character 91 indicates a strip of photoconductive material applied to the squeegee. Reference character 92 represents a strip of electrically conductive material and reference character 93 represents a series of parallel conductive strands such as lengths of fine copper wire. The structure of this element is more fully shown in sectional view in FIG. 14. Reference character 94 represents a strip of rubber or similar material which forms the basis for element 90. The conductive strip 92 and the wires 93 are then applied to the rubber strip 94 and the photoconductive strip 91 is applied over the edges of elements 91 and 92. A protective rubber covering 95 may then be applied, if desired, over wires 93 for protection thereof. An illustrative application of this element is shown in FIG. 15. This apparatus includes a drum 96 which is rotated by a motor 81. The drum, however, does not incorporate any photoconductive layer. Drum 96 should be electrically conductive although it may be desirable to include a very thin insulating or resistive layer thereover. The squeegee element 90 is positioned as shown so that it contacts the drum and traps a quantity of electroviscous liquid 26 behind itself. It is generally desired that the tips of the conductive strands or wires 93 should come close to the surface of the drum 96 but preferably should not come into actual contact therewith. A battery 33 is connected between the squeegee element 90 and the drum 96 as shown. Projector 77 projects a light pattern onto the photoconductive strip 91 of the squeegee element 90. Where the light strikes the photoconductive element 91, an electrical connection is created between one of the wires 93 and the conductive element 92 and thence to battery 33. When one of the wires 93 is connected to battery 33 through the action of light from projector 77, it creates an electric field at the surface of drum 96 which freezes electroviscous fluid 26 and thereby permits it to be drawn past the contacting tip of the squeegee element 90. In other regions, the electroviscous liquid remains in a fluid condition and is prevented from working past the edge of the squeegee. If projector 77 is operated so as to present to the photoconductive strip 91 a moving image synchronized with the movement of drum 96 there will thus be formed a pattern of electroviscous fluid on the surface of the drum corresponding to the light pattern projected from projector 77. This image may be examined on drum 96 or preferably transferred by means of a roller 79 to a recording member 21 such as a web of paper or the like. Squeegee 90 may also be modified by eliminating the conductive element 91 and instead connecting each individual wire 93 to a separate electrical circuit. Each circuit may include a separate photocell or the circuits may be connected in known fashion to a facsimile receiving device or other form of electronic apparatus providing a series of output terminals which are intended to correspond to different spatial positions. In this manner, any arbitrary pattern may be reproduced as pattern of electroviscous fluid by applying electric pulses to the individual wires 93 at appropriate times. Also, a fiber optic device, such as that of FIG. 6 may be used instead of projector 77.

The above figures and the description provided therewith serve to illustrate the many variations possible in the use of electroviscous fluids as a graphic recording material. Many modifications of the described embodiments are suggested by the preceding descriptions themselves and others will be obvious to any technically competent person. Such variations are integral parts of the present invention, except as limited by the following claims.

In the claims:

1. Image reproducing apparatus comprising liquid containing means adapted to contain electroviscous liquid and having an aperture therein, means to move an image recording member past said aperture, means to maintain liquid under pressure within said containing means for inducing liquid flow through said aperture onto said recording member, at least one pair of electrodes at said aperture, and circuit means to selectively apply a voltage between said electrodes to overcome said maintained pressure and inhibit the flow of said electroviscous liquid therethrough thereby forming a liquid pattern on said image recording member.

2. Apparatus according to claim 1 including a multiplicity of pairs of electrodes.

3. Apparatus according to claim 1 in which said aperture comprises a narrow slit defined by a pair of electrodes in contact with said liquid.

4. Apparatus according to claim 3 in which at least the slit defining portion of one of said pair of electrodes is covered with a layer of photoconductive material.

5. Apparatus according to claim 1 further including means to transfer the liquid pattern from said image recording member to a second image recording member.

6. Apparatus according to claim 1 further including means to induce cyclic pressure variations in the liquid containing means.

7. Image reproducing apparatus comprising container means for pressurized dispensing of an electroviscous liquid onto the surface of a receiving element and electrical means including light responsive means for selectively forming an electric field reacting on said liquid at the dispensing portion of said container means to permit and inhibit pressurized liquid dispensing according to a pattern of light and shadow on said light responsive means whereby an image pattern of said electroviscous fluid is formed on said surface according to said pattern of light and shadow.

8. Apparatus according to claim 7 wherein said container means includes spaced electrodes.

9. Apparatus according to claim 8 wherein said spaced electrodes are fixed with respect to each other.

10. Apparatus according to claim 8 wherein at least one of said electrodes moves relative to another of said electrodes.

11. Image reproducing apparatus comprising liquid containing means adapted to contain electroviscous liquid and having an aperture therein formed as a narrow slit defined by at least one pair of electrodes, wherein at least the slit defining portion of one of said pair of electrodes is covered with a layer of photoconductive material and said one electrode includes an array of light conducting optical fibers disposed and adapted to conduct light in image configuration to said layer of photoconductive material, means to move an image recording member past said aperture, means to maintain liquid under pressure within said containing means, and circuit means to selectively apply a voltage between said electrodes to inhibit the flow of said electroviscous liquid therethrough, thereby forming a liquid pattern on said image recording member.

12. Image reproducing apparatus comprising liquid containing means adapted to contain electroviscous liquid and having an aperture therein formed as a narrow slit defined by at least one pair of electrodes, wherein at least the slit defining portion of one of said pair of electrodes is covered with a layer of photoconductive material and said one electrode includes an array of light conducting optical fibers disposed and adapted to conduct light in image configuration to said layer of photoconductive material from an external image to be reproduced, means to move an image recording member past said aperture, means to maintain liquid under pressure within said containing means, and circuit means to selectively apply a voltage between said electrodes to inhibit the flow of said electroviscous liquid therethrough, thereby forming a liquid image pattern on said image recording member.

13. Image reproducing apparatus comprising liquid containing means adapted to contain electroviscous liquid and having an aperture therein, means to move an image recording member past said aperture, means to maintain liquid under pressure within said containing means, at least one pair of electrodes at said aperture, circuit means to selectively apply a voltage between said electrodes to inhibit the flow of said electroviscous liquid therethrough, thereby forming a liquid pattern on said image recording member, and means to cyclically displace the image recording member between a position in liquid transferring contact with said aperture and a position out of liquid transferring contact with said aperture.

References Cited by the Examiner

UNITED STATES PATENTS

| | | | |
|---|---|---|---|
| 2,505,049 | 4/1950 | Keller | 137—251 |
| 2,892,709 | 6/1959 | Mayer | 95—1.7 X |
| 2,907,674 | 10/1959 | Metcalfe et al. | 95—1.7 X |

(Other references on following page)

UNITED STATES PATENTS

| | | | |
|---|---|---|---|
| 2,909,971 | 10/1959 | Barber | 95—1.7 |
| 2,946,682 | 7/1960 | Lauriello | 96—1 |
| 2,947,625 | 8/1960 | Bertelsen | 96—1 |
| 2,968,553 | 1/1961 | Gundlach | 96—1 |
| 3,009,402 | 11/1961 | Crumrine et al. | 95—1.7 |
| 3,062,110 | 11/1962 | Shepardson et al. | 95—1.7 |
| 3,121,375 | 2/1964 | Fotland et al. | 95—1.7 |

OTHER REFERENCES

National Bureau of Standards Bulletin, June 1949, pp. 74–76.

JOHN M. HORAN, *Primary Examiner.*

N. G. TORCHIN, EVON C. BLUNK, *Examiners.*

A. L. LIBERMAN, *Assistant Examiner.*